Figure 5:
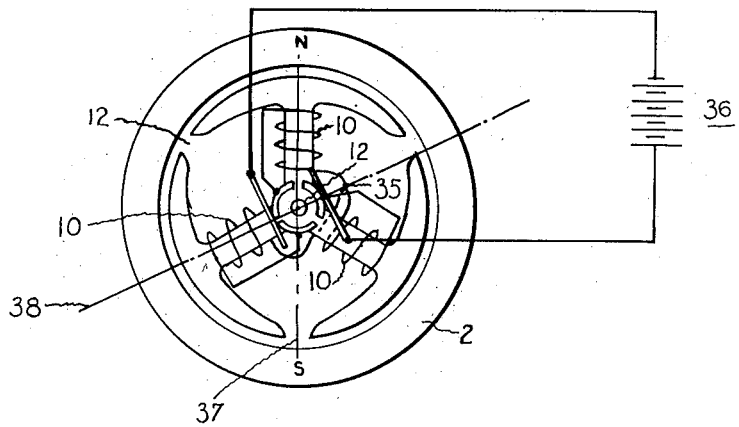

Dec. 31, 1957  E. A. PHANEUF ET AL  2,818,518
ELECTRIC MOTOR AND METHOD OF MANUFACTURE THEREFOR
Filed March 17, 1954  2 Sheets-Sheet 1
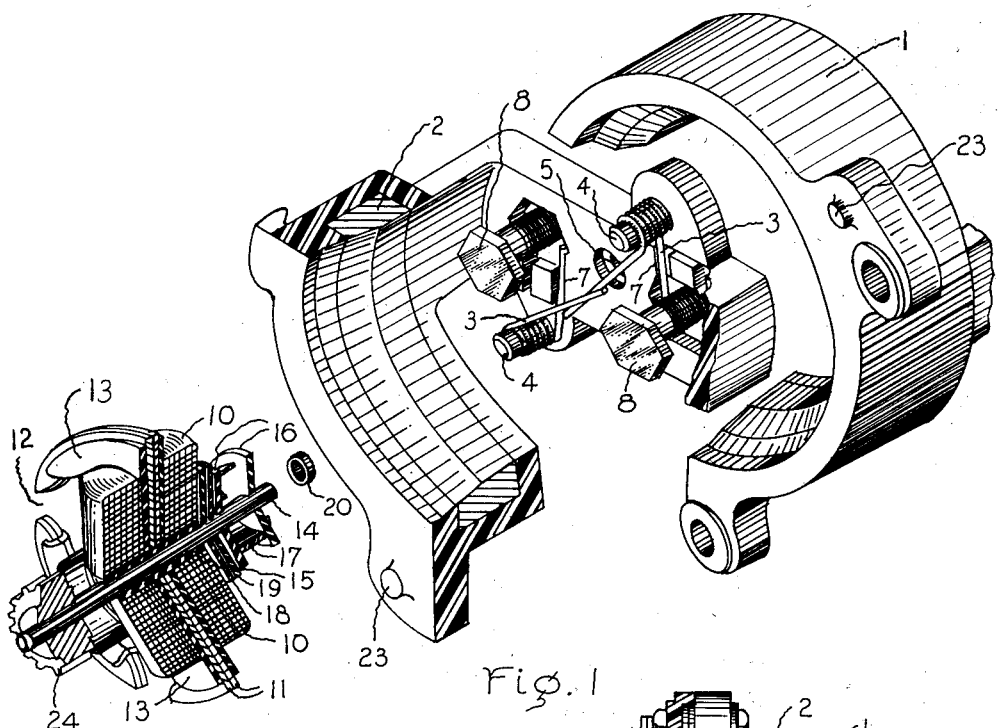
Fig. 1
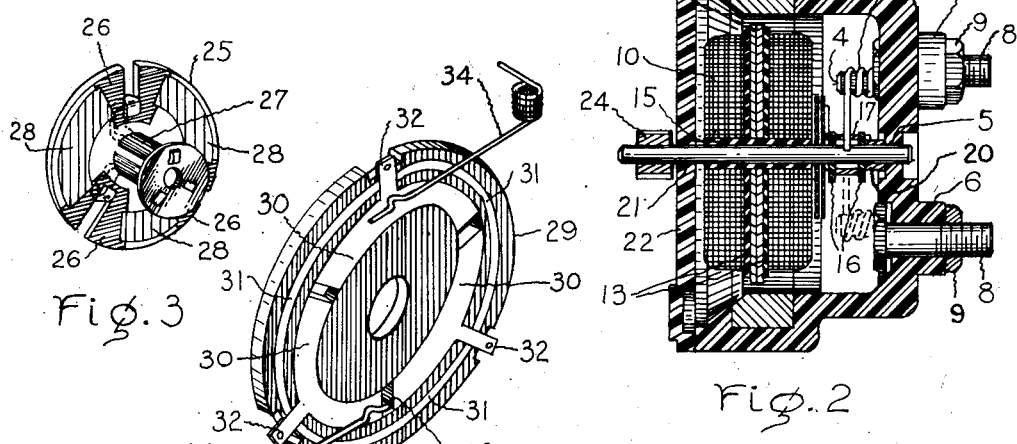
Fig. 3
Fig. 4
Fig. 2
Inventors:
Edgar A. Phaneuf
Hans Springer
John R. Enochs
by, *Richard E. Horley*
Their Attorney Dec. 31, 1957   E. A. PHANEUF ET AL   2,818,518
ELECTRIC MOTOR AND METHOD OF MANUFACTURE THEREFOR
Filed March 17, 1954   2 Sheets-Sheet 2

Inventors:
Edgar A. Phaneuf
Hans Springer
John R. Enochs
by, Richard E. Hosley
Their Attorney United States Patent Office 2,818,518
Patented Dec. 31, 1957

2,818,518

ELECTRIC MOTOR AND METHOD OF MANUFACTURE THEREFOR

Edgar A. Phaneuf, Southborough, and Hans Springer and John R. Enochs, Ashland, Mass., assignors to General Electric Company, a corporation of New York Application March 17, 1954, Serial No. 416,746

13 Claims. (Cl. 310—177)

This invention relates to electric motors and to the method of manufacture therefor and has particular application to miniature direct current motors of the type equipped with a permanent magnet field and adapted to be operated from low voltage direct current power sources, such as storage batteries or dry cells.

The motor described herein and embodying this invention is particularly well suited as a drive means for electric clocks and timing devices such as the type described and claimed in application Serial No. 416,774 of one of us, Hans Springer, entitled "Electric Timing Device," filed March 17, 1954, and assigned to the assignee of the present invention.

Clocks and timers of the type described in the above-mentioned application are particularly well adapted for use in automobiles, boats, aircraft and other movable craft and vehicles wherein the only source of electrical power available is normally a low voltage direct current source, such as a storage battery. It can be appreciated that, in order to meet the needs of the automobile and other high production rate industries, it is particularly important that the drive motor for a clock or timing device be low in cost and adapted to be producible by mass production manufacturing techniques while at the same time, of course, fulfilling the requirements for reliability and a satisfactory operating life.

In order to insure optimum performance and minimize arcing between the brushes and the commutator segments in a direct current permanent magnet motor, it is, of course, necessary to properly position the magnetic axis of the permanent magnet field with relation to the axis of brush contact. Even though this is accomplished, some arcing may still occur, and the operating life may therefore be even further extended by providing discharge resistors connected between adjacent commutator segments to absorb the energy otherwise dissipated in the arc so that burning and pitting of the brushes and commutator are even further reduced.

Accordingly, it is one object of this invention to provide the above-mentioned features in a low cost direct current motor together with a method of manufacturing the motor with a minimum of assembly procedures and by mass production techniques.

It is another object of this invention to provide an improved low cost method of manufacture for a permanent magnet direct current motor whereby the magnetic axis of the permanent magnet field is accurately and permanently positioned during the manufacturing process in predetermined relationship with respect to the other components of the motor.

It is a further object of this invention to provide an improved direct current electric motor having a low cost, mass producible discharge resistor arrangement interconnecting adjacent commutator segments.

It is still a further object of this invention to provide an improved commutator assembly embodying a self-contained printed discharge resistor arrangement interconnecting adjacent commutator segments.

Briefly stated, in accordance with one aspect of this invention an electric motor is provided with a casing formed of a suitable plastic or other moldable material molded around an annularly shaped magnetic field member. Molded integrally with the casing are means for positioning and supporting the brushes in place and also alignment means, the purpose of which will be later explained. Thus a unitary stator assembly comprising the casing, the field member, the brush positioning means and the alignment means is formed in a single molding operation. The unitary stator assembly is then placed in a magnetizing fixture and aligned therein by means of the above-mentioned alignment means forming a part of the unitary stator assembly. The annular field member is then magnetized while the stator assembly is aligned in the magnetizing fixture so that the magnetic axis of the field is permanently positioned in predetermined relationship with respect to the brush positioning means which determine the brush contact axis. Thus a unitary assembly is formed in which the magnetic axis of the field is accurately and permanently pre-positioned during the manufacturing process with respect to the other components of the motor. The result is a low cost motor structure in which the magnetic axis of the field and the brush contact axis are accurately and permanently positioned in the motor to yield optimum performance and minimize arcing between the brushes and commutator. It should be apparent that the unitary stator assembly may be formed in other ways so long as the various components are positioned therein prior to the operation of magnetizing the field member in predetermined relationship to the other components.

In addition to the provision of the feature wherein the magnetic axis of the field is positioned in a unitary casing structure in predetermined relationship with respect to the brush positioning means, additional means are provided for further reducing arcing between the brushes and commutator and extending the operating life of the motor. In one embodiment of this invention, printed circuit discharge resistor means are applied directly to an insulating surface rotatable with the rotor assembly and are connected between adjacent commutator segments to absorb the inductive energy from the windings which would otherwise be dissipated in arcing between the brushes and commutator. The printed circuit discharge resistors may be formed as a part of the commutator assembly or may be applied on a separate member attached to rotate with the rotor assembly.

This invention will be better understood and other objects and advantages will be apparent from the following description taken in connection with the accompanying drawings, and its scope will be pointed out in the appended claims.

Figure 6:
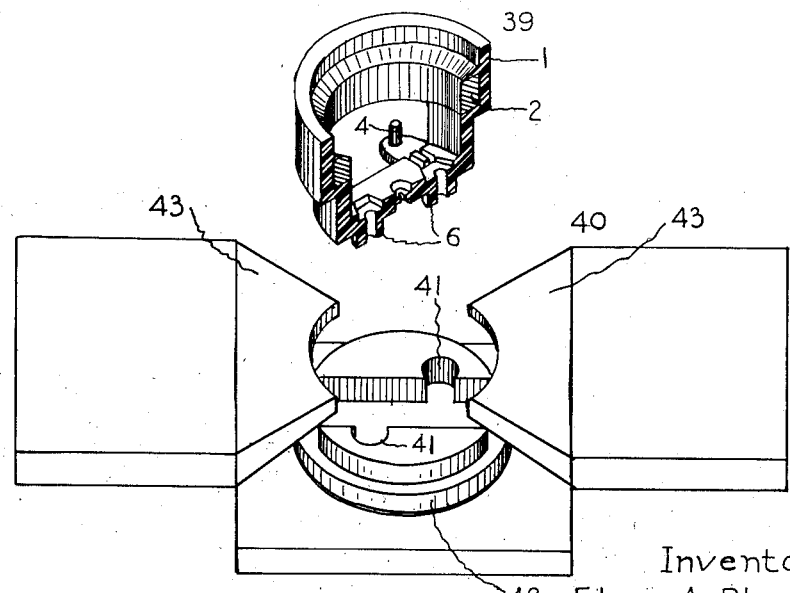

Referring to the drawings Figure 1 is an exploded view, partly in cross section of a direct current motor embodying this invention; Figure 2 is a cross sectional view of the motor illustrated in Figure 1; Figure 3 is a perspective view of a unitary commutator assembly embodying the printed circuit discharge resistor forming a part of this invention; Figure 4 illustrates an alternative commutator construction to that shown in Figure 3; Figure 5 is a diagrammatic illustration showing the circuit through the motor from the power source; while Figure 6 is a perspective view illustrating a portion of a magnetizing fixture together with a section of the motor stator assembly showing the method of aligning the stator assembly in the fixture prior to magnetization of the field member.

Referring to Figures 1 and 2 of the drawings, the motor illustrated therein and embodying this invention comprises a molded casing 1 which is formed of any suitable plastic such as a cotton flock filled thermosetting phenolic molding compound or other moldable and preferably insulating material. An annular permanent magnet field member 2 is embedded in the casing and is diametrically magnetized in a manner hereinafter described in more detail. A pair of resilient brushes 3 are positioned and supported in the casing by means of a pair of studs 4 integrally molded with the casing 1. A journal bearing portion 5 and a pair of alignment posts 6 are also integrally molded with the casing 1. The alignment posts are positioned in predetermined relationship with respect to the brush positioning and supporting studs 4 in order to facilitate proper alignment of the magnetic axis of the field member 2 with respect to the brush holders 4 during the manufacturing process in a manner hereinafter set forth. The brushes 3 are angularly restrained in the slots 7 which are also integrally molded in the casing and are secured in place by means of a pair of bolts 8 extending through the casing 1. The bolts 8 serve to make the electrical contact through the casing with the brushes and are secured in the casing by means of the nuts 9.

The rotor assembly, shown partly in cross section in Figure 1, comprises three symmetrically disposed radially extending coils 10 which are electrically connected in Y relationship at their inner ends as illustrated in Figure 5. Three symmetricaly disposed pole shoes are formed of a pair of laminations 11 having aligned central apertures 12 therein as illustrated in Figures 1, 2 and 5. The rotor coils 10 are insulated from the pole shoe laminations 11 by the insulating members 13 as shown in Figures 1 and 2. The rotor coil assembly is pressed on to a shaft 14, over an insulating bushing 15. This arrangement may be slightly varied by pressing the laminations 11 directly on to the shaft 14. In such an arrangement the insulating bushing 15 would be formed of two separate parts assembled over the shaft 14 on opposite sides of the laminations 11.

The commutator assembly is comprised of a pair of discs 16 formed of a suitable insulating material and pressed on to the shaft 14. Three arcuately shaped commutator segments 17 extend between the discs 16 and are provided with tab portions which extend through corresponding slots in the discs 16 and are bent over to secure the segments in place between the discs. The commutator assembly is insulated from the coil assembly by a disc 18 and an additional insulating disc 19 is provided to carry a printed circuit discharge resistor arrangement interconnecting the adjacent commutator segments. The details of this arrangement will be explained in connection with the subsequent description of Figures 3 and 4.

Referring again to Figures 1 and 2, the rotor shaft 14 is supported in the casing 1 at one end thereof in the bearing portion 5 which is formed integrally with the casing and concentrically aligned with respect to the field member 2. A spacer 20 engages the shoulder of the bearing portion 5 and one of the commutator discs 16 to axially position the rotor assembly in the casing. The other end of the rotor shaft is supported in a bearing portion 21 formed in a cover plate 22. The cover plate 22 is aligned with the casing by means of the dowel pins 23 which are integrally formed with the casing and which mate with corresponding aligning holes formed in the plate 22. A pinion 24 is mounted on the shaft 14 in any suitable manner to provide means for coupling the motor to the load. In some installations, it may be more convienient to remove the plate 22 and support that end of the shaft 14 directly in the structure of the device to which the motor is coupled. The motor is readily adaptable to such an arrangement since the dowel pins 23 can then serve to properly align the motor directly on the structure to which it is coupled.

Figure 3 illustrates a unitary commutator assembly which is an alternative structure to that shown in Figures 1 and 2 and which includes the printed circuit discharge resistor arrangement as a part of the commutator assembly. The commutator segments are supported in the same manner as shown in Figures 1 and 2 except that an enlarged supporting disc 25 is provided to support the printed discharge resistors. The disc 25 is formed of a suitable insulating material and three thin copper segments 26 are attached to the surface thereof to form the electrical connections to the commutator segments 27. The commutator assembly can be mounted on the rotor shaft in the same manner as is the assembly shown in Figures 1 and 2, and the respective coil leads are then soldered to the copper segments 26. A resistive material 28 is applied to the surface of disc 25 by any suitable printed circuit technique such as by painting, spraying, die stamping, photoengraving, dusting, chemical deposition and so forth. The resistive material 28 extends between and slightly overlaps the copper segments 26 thereby forming discharge resistors connected between adjacent segments of the commutator. For the particular motor described herein, the resistance of each of the individual resistor segments is in the vicinity of 1,000 ohms, but it is apparent that any desired resistance value may be obtained by proper selection of the material used and the particular configuration employed. It is also apparent that the supporting member 25 need not be formed of an insulating material so long as an insulating surface is provided on which the resistive material can be applied and the commutator segments are properly insulated from each other. The resistive material can be applied in any suitable manner so long as it is integrally affixed to the insulating surface. The printed discharge resistors may be applied to a separate supporting member on the rotor assembly as illustrated in the construction shown in Figures 1 and 2 in which the printed resistors are applied to the separate disc 19.

Figure 4 illustrates another printed circuit discharge resistor arrangement in which the printed resistors and the commutator segments are formed on a single supporting member such as a disc 29. The commutator segments 30 are formed of thin suitably conducting material and are attached or applied to the surface of the disc 29 either by printed circuit techniques or by other methods. A resistive material 31 is then applied directly to the surface of the disc 29 so that a discharge resistor network is formed interconnecting adjacent segments of the commutator. The resistive material is applied by means of any suitable printed circuit technique such as those set forth above in connection with the description of Figure 3. The commutator segments 30 are provided with suitable tabs 32 to allow attachment of the rotor coil leads and are separated from each other by the slots 33 provided in the disc 29. Electrical contact with the commutator segments may be made by means of a pair of resilient wire brushes 34 similar to those illustrated in Figures 1 and 2 except that the brush supporting studs would be repositioned to support the brushes in the axial contact relationship illustrated in Figure 4. It should be apparent here also that, although the supporting member 29 is preferably formed of an insulating material, it may also be formed of other materials so long as an insulating surface is provided on which the printed circuit resistors may be applied and suitable insulation is provided between the commutator segments. It will also be apparent that various other modifications and changes may be made in the particular printed discharge resistor arrangements illustrated herein without departing from the true essence of this invention.

Referring to the illustration of Figure 5, the rotor coils are connected together at their inner ends, as shown at 35, in Y relationship. Each of the outer ends of the coils is connected to a corresponding commutator segment as shown. The brushes are connected to a suitable direct current power source 36 through the bolts 8 which extend through the casing as illustrated in Figures 1 and 2. The annular field magnet 2 is diametrically magnetized along the magnetic axis 37 in predetermined relationship to the brush positioning and supporting studs 4, illustrated in Figures 1 and 2, which determine the brush axis 38.

As previously stated, it is important that the magnetic axis of the field be properly positioned with respect to the brush axis not only to ensure optimum motor performance but also to minimize arcing between the brushes and commutator. The optimum relationship between the magnetic and brush axes of course varies for different designs with the configuration of the rotor coils, the field distribution, and other parameters but the basic objective of positioning these two axes in the proper relationship in a low cost assembly and with the minimum of manufacturing and assembly procedures is common to all motors of this type.

Figure 6 serves to illustrate in general a method of achieving this objective and in particular the method of manufacturing the stator assembly of the motor shown in Figures 1 and 2. In general this method comprises forming a unitary stator assembly 39 including the casing 1, the field member 2 and the brush positioning means 4 and then magnetizing the field member in a suitable magnetizing fixture 40 to position the magnetic axis of the field in predetermined relationship with the brush positioning means 4 which determine the brush axis. This method eliminates a number of manufacturing and assembly operations that would otherwise be required to properly align and position a pre-magnetized field member together with brush positioning means in a casing. This method is particularly advantageous when it is desired to employ an annular field member such as that illustrated since there are no inherent aligning or identifying surfaces in such a symmetrical structure by which the magnetic axis could be aligned or positioned. In the embodiment illustrated, the unitary stator assembly 39 is formed in a single molding operation with the annular field member 2 being first positioned in a mold, the casing then being molded around the field member to permanently secure it in place. In the same operation the brush positioning means 4 and alignment means such as the posts 6 are formed integrally with the casing. The alignment posts 6 engage the cooperating aligning surfaces 41 in the base plate 42 of the magnetizing fixture to permit proper positioning of the stator assembly in the fixture. The magnetizing fixture is provided with a pair of pole shoes 43 and with the usual magnetizing coils and other associated equipment not shown.

The method of forming the unitary stator structure in a single molding operation has obvious manufacturing and cost advantages, but it will be apparent that other methods of forming the unitary stator structure may be employed while still obtaining the advantages inherent in this invention and, as such, coming within the true spirit of this invention.

Thus it can be seen that this invention provides among other advantages, a low cost, mass producible direct current electric motor together with a method of manufacture therefor, in which the magnetic field axis is accurately positioned in predetermined relationship with respect to the brush axis thereby yielding optimum performance and minimizing brush and commutator arcing, and in which arcing between the brushes and commutator is still further reduced and virtually eliminated by the provision of a novel, low cost discharge resistor arrangement.

It will be apparent from the foregoing that various changes, modifications and substitutions may be made in the embodiments of this invention described herein without departing from the true scope and spirit of this invention in its broader aspects.

What we claim as new and desire to secure by Letters Patent of the United States is:

1. A direct current electric motor comprising a rotatably mounted rotor assembly, said rotor assembly including a commutator and rotor windings electrically connected to said commutator, a thin disc formed of insulating material, said disc being affixed to said rotor assembly and rotatable therewith, and printed discharge resistor means for said windings comprising an electrically resistive material applied directly to a side surface of said disc and electrically connected between adjacent segments of said commutator.

2. A rotor for a direct current electric motor comprising a supporting shaft, a pair of commutator supporting discs supported on said shaft in axially spaced substantially parallel relationship to each other and extending transversely to the axis of said shaft, a plurality of commutator segments extending between and secured to said discs, rotor windings electrically connected to said segments, an insulating side surface on one of said discs, and printed discharge resistor means for said windings comprising an electrically resistive material applied directly to said insulating side surface and electrically connected between adjacent commutator segments.

3. A rotor for a direct current electric motor comprising a supporting shaft, a thin disc attached to rotate with said shaft, a plurality of commutator segments affixed to said commutator supporting member, rotor windings electrically connected to said commutator segments, an insulating side surface on said thin disc, and discharge resistor means for said windings comprising an electrically resistive material applied directly to said insulating side surface and electrically connected between adjacent commutator segments.

4. A commutator assembly comprising a pair of discs coaxially positioned in spaced substantially parallel relationship to each other, a plurality of commutator segments extending between and secured to said discs to form a unitary structure with said discs, an insulating side surface on one of said discs, and printed resistor means electrically interconnecting adjacent commutator segments, said printed resistor means comprising an electrically resistive material applied directly to said insulating side surface.

5. A commutator assembly comprising a thin disc having a side insulating surface thereon, a plurality of commutator segments secured to and supported by said supporting member, and printed resistor means comprising an electrically resistive material applied directly to said insulating side surface on said disc and electrically connected between adjacent commutator segments.

6. A direct current electric motor comprising a molded casing, a substantially annularly shaped permanent magnet field member, at least a portion of said field member being imbedded in said casing to permanently secure said field member in said casing, a pair of brush positioning and supporting studs integrally formed with said casing, said studs being arranged generally parallel to the axis of said annular permanent magnet, two locating posts formed integrally with said casing and arranged generally parallel to said studs and to the axis of said annular permanent magnet, said field member being located by said posts and being diametrically magnetized in predetermined fixed relationship with respect to said posts and said brush positioning and supporting studs, a rotor assembly including a commutator and rotor windings electrically connected to the segments of said commutator said rotor being arranged coaxially with said annularly shaped magnet, and a pair of resilient brushes positioned and supported on said brush positioning and supporting studs and resiliently engaging said commutator along a brush axis positioned in predetermined relationship with respect to the magnetic axis of said field member by means of said brush positioning and supporting studs integrally molded with said casing.

7. A direct current electric motor comprising a molded casing, a substantially annularly shaped permanent magnet field member at least a portion of which is embedded in said casing to permanently secure said field member in said casing, a rotatably supported rotor assembly including a commutator and rotor windings electrically connected to the segments of said commutator, said rotor being arranged generally coaxially with said annularly shaped magnet, a pair of brush positioning and supporting studs formed integrally with said casing, each of said studs extending in spaced substantially parallel relationship to the axis of rotation of said rotor assembly, and a pair of brushes formed of a resilient material, a portion of each of said brushes being formed into a coil shaped portion fitting over one of said studs for supporting and positioning said brushes in engaging relationship with respect to said commutator, said field member being diametrically magnetized in fixed predetermined relationship with respect to said studs, whereby said brushes are supported and positioned in predetermined relationship with respect to the magnetic axis of said field member by means of said studs integrally formed with said casing.

8. The method of manufacturing a stator assembly for a direct current dynamoelectric machine which comprises first forming a unitary structure comprising a casing, an annular magnetic field member, and brush positioning means, and then permanently magnetizing said field member in a predetermined relationship with respect to said brush positioning means.

9. The method of manufacturing a stator assembly for a direct current dynamoelectric machine which comprises first molding a casing around at least a portion of an annular magnetic field member together with brush positioning means to form a unitary structure, and then permanently magnetizing said field member in predetermined relationship with respect to said brush positioning means.

10. The method of manufacturing a stator assembly for a direct current motor which comprises molding a casing around at least a portion of an annular magnetic field member to permanently secure said field member in said casing, affixing brush positioning means and alignment posts to said casing to form a unitary structure together with said casing and said field member, placing said unitary structure in a magnetizing fixture and aligning said structure in said fixture by means of said alignment posts, and then permanently magnetizing said field member, whereby the magnetic axis of said field member is permanently positioned in predetermined relationship with respect to said brush positioning means and alignment posts.

11. The method of manufacturing a stator assembly for a direct current motor which comprises molding a casing around at least a portion of an annular magnetic field member to permanently secure said field member in said casing and in the same operation molding brush positioning means and alignment posts integral with said casing and in predetermined relationship to each other to form a unitary structure with said casing and said field member, placing said structure in a magnetizing fixture and aligning said structure in said fixture by means of said alignment posts, and then permanently magnetizing said field member in said fixture, whereby the magnetic axis of said field member is permanently positioned in predetermined relationship with respect to said brush positioning means and alignment posts.

12. The method of manufacturing a stator assembly for a direct current motor which comprises positioning an annular magnetic field member in a mold, molding a casing around at least a portion of said field member to permanently secure said field member in said casing and in the same operation integrally molding as a part of said casing brush positioning means and alignment posts in predetermined relationship to each other so that a unitary structure comprising said casing, said field member, said brush positioning means, and said alignment posts is formed in said mold, placing said unitary structure in a magnetizing fixture and aligning said structure in said fixture by means of said alignment posts and cooperating alignment means in said fixture, and then permanently magnetizing said field member in said fixture, whereby the magnetic axis of said field member is permanently positioned in predetermined relationship with respect to said brush positioning means and alignment posts.

13. The method of manufacturing a direct current motor which comprises positioning a substantially annularly shaped magnetic field member in a mold, molding a casing around at least a portion of said field member to permanently secure said field member in said casing and in the same operation molding as a part of said casing brush positioning means, alignment means, and a journal bearing portion in said casing coaxially positioned with respect to the central axis of said field member so that an integral structure is formed in said mold, placing said integral structure in a magnetizing fixture and aligning said structure in said fixture by means of said alignment means integrally formed with said casing and cooperating alignment means in said fixture, diametrically magnetizing said field member in said fixture, forming a rotor assembly having a commutator and rotor windings electrically connected to said commutator, rotatably mounting said rotor assembly in said casing with one end of said rotor assembly supported in said journal bearing portion, and positioning a pair of brushes on said brush positioning means so as to be engageable with said commutator, whereby said brushes are positioned by said brush positioning means to engage said commutator in a predetermined relationship with respect to the magnetic axis of said field member.

References Cited in the file of this patent

UNITED STATES PATENTS

| | | |
|---|---|---|
| 773,881 | Milch | Nov. 1, 1904 |
| 1,018,141 | Viall | Feb. 20, 1912 |
| 1,895,460 | Hanley | Jan. 31, 1933 |
| 1,950,753 | Scofield | Mar. 13, 1934 |
| 1,960,470 | Whiteside | May 29, 1934 |
| 2,212,192 | Howell | Aug. 20, 1940 |
| 2,265,293 | Kuehn | Dec. 9, 1941 |
| 2,301,425 | List | Nov. 10, 1942 |
| 2,470,096 | Eck | May 17, 1949 |
| 2,532,700 | Eurich et al. | Dec. 5, 1950 |
| 2,632,123 | Kober | Mar. 17, 1953 |
| 2,688,679 | Schleuning | Sept. 7, 1954 |

FOREIGN PATENTS

| | | |
|---|---|---|
| 714,929 | Germany | Dec. 10, 1941 |